Dec. 6, 1966    G. W. BUSH    3,289,799
COLLAPSIBLE HANDLE WITH HIDEAWAY LINKAGE
Filed April 18, 1966    2 Sheets-Sheet 1

INVENTOR.
GEORGE W. BUSH
BY
Millman and Jacobs
ATTORNEYS.

Dec. 6, 1966     G. W. BUSH     3,289,799

COLLAPSIBLE HANDLE WITH HIDEAWAY LINKAGE

Filed April 18, 1966     2 Sheets-Sheet 2

INVENTOR.
GEORGE W. BUSH

BY
Millman and Jacobs
ATTORNEYS

United States Patent Office 3,289,799
Patented Dec. 6, 1966

3,289,799
COLLAPSIBLE HANDLE WITH HIDEAWAY LINKAGE
George W. Bush, Haddonfield, N.J., assignor to Philadelphia Handle Company, Inc., Camden, N.J., a corporation of New Jersey
Filed Apr. 18, 1966, Ser. No. 544,668
8 Claims. (Cl. 190—58)

This is a continuation-in-part of application Serial No. 467,566 filed June 28, 1965.

This invention relates to a collapsible handle for use in transporting various carrying cases and particularly portable radios, television sets, electronic test equipment and the like, the primary object of which is to provide a handle that confines and conceals the attaching linkage and hardware when it is collapsed against the case and is equipped with means which when released will cause the handle to move to a raised carrying position.

Another object of the invention is to provide a handle of the character described in which release from its collapsed position can be readily effected by slight movement thereof relative to the case.

Another object of the invention is to provide a collapsible handle of the character described which is relatively simple in construction, comfortable to engage and capable of taking various attractive forms.

These and other objects of the invention will become more apparent as the following description proceeds in conjunction with the accompanying drawing, wherein.

Specific reference is now made to the drawings wherein similar reference characters are used for corresponding elements throughout.

The instant handle is generally indicated at 10 and is shown attached to the upper wall 12 of a television set 14, it being understood that this is merely illustrative of other electronic devices, radios, test equipment and the like. Moreover, while the principles of the invention are particularly applicable to such equipment, they are also applicable to other carrying cases and luggage as well.

The handle includes an elongated rigid handgrip portion 16 which may be of any desired contour and may be made of plastic, wood, leather or the like materials, but is preferably molded as a one piece plastic member. The handgrip is made of a thickness which is comfortable to grip and includes an undersurface 18 which is adapted to lie flush against the upper surface of the attaching wall 12.

Figure 5:
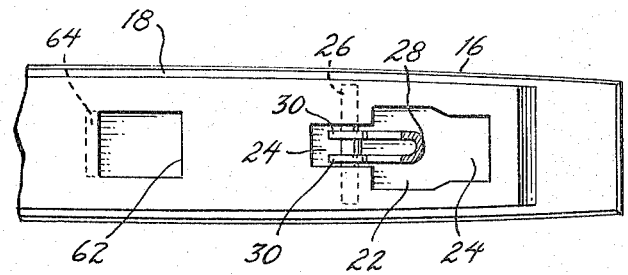
FIG. 5 is a bottom view of the handgrip taken on the line 5—5 of FIG. 4.

A pair of elongated recesses or cavities 20 are provided in the handgrip which open through the undersurface 18, the recess being generally rectangular in horizontal cross-section and having a central portion 22 which is somewhat wider than end portions 24, see FIG. 5, the former being closer to the center of the grip and the latter to the end thereof. Mounted in suitable bores in the grip and extending transversely through each end portion 22 of the recess is a pivot pin 26.

Figure 6:
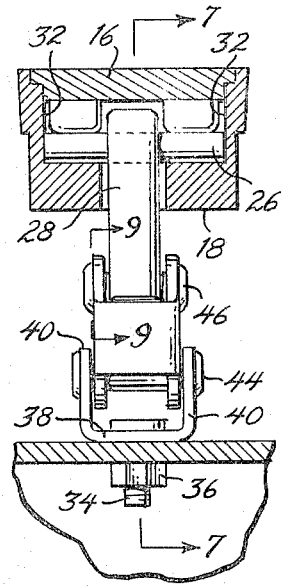
FIG. 6 is a sectional view taken on the line 6—6 of FIG. 4.

An upper link 28 is provided which consists of a flat bar with a pair of spaced depending apertured arcuate ears 30 and 31 at its ends which are inwardly displaced from the side edges of the bar. The pivot pin 26 extends through aligned apertures in the ears 30 so that the link 28 is pivoted around the pin 26, i.e. around a horizontal axis transverse the handgrip, the ears 30 being disposed in the recess portion 24 and spaced inwardly from the opposite side walls 32 of the recess, see FIGS. 6 and 8.

At predetermined locations the wall 12 is provided with holes through each of which extends the shank of a threaded member 34 which receives a closure nut 36. It will be noted that the threaded member extends into the case beyond the wall 12 only for a distance sufficient to receive the closure nut. The shank is carried by a substantially U-shaped member having a web 38 which bears on the wall 12 and includes a pair of spaced upstanding ears 40. The horizontal cross-sectional contour of the bottom of the web 38 is preferably rectangular so that both bearing members can be properly aligned relative to each other and to the recesses in the handgrip.

Figure 9:
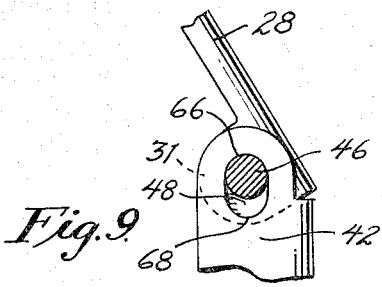
FIG. 9 is a sectional view taken on the line 9—9 of FIG. 6.
Figure 10:
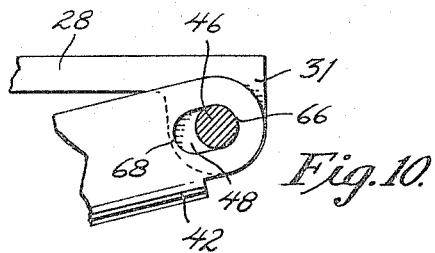
FIG. 10 is a view similar to FIG. 9 illustrating the lowered position of the handle.

A second or lower link 42 in the form of a narrow bar is provided, the lower end of which extends between the ears 40 and has an aperture which receives a horizontal pivot pin 44 that is carried by the ears 40. The other or upper end of the link 42 extends between the ears 31 of the first link 28, which ears carry a horizontal transverse pivot pin 46 that extends through an elongated slot 48 in said other end of the lower link 42, as seen in FIGS. 9 and 10. It should be noted that the overall length of the first link 28 is less than that of the recess 22 but greater than that of the second link 42, that the distance between each pair of the ears 30 and 31 is less than the width of the end recess portion 24, that the pin 44 is also shorter than the width of the recess portion 24, and that the maximum width of the bearing member 38 approximates but is less than that of central recess portion 22.

Figure 8:
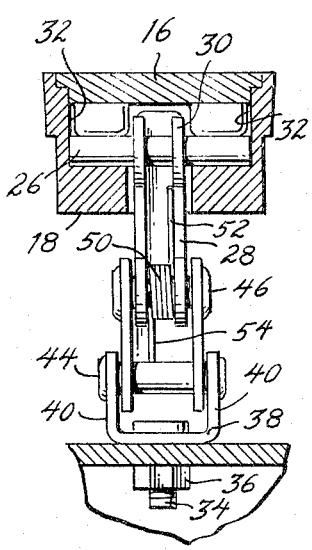
FIG. 8 is a sectional view taken on the line 8—8 of FIG. 7.
Figure 7:
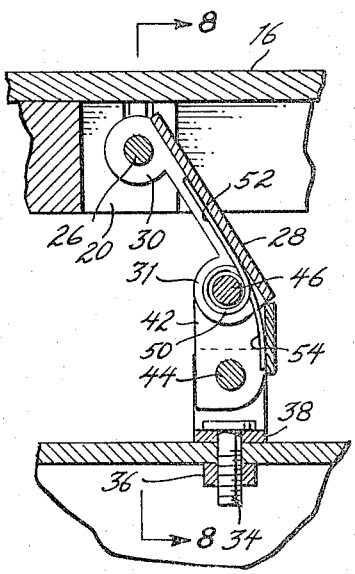
FIG. 7 is a sectional view taken on the line 7—7 of FIG. 6.

A spring is provided for each set of links preferably in the form of a wire coiled as at 50 about the pin 46 and having end portions 52 and 54 which bear against the inner faces of the upper and lower links 28 and 42 respectively, see FIGS. 7 and 8, the spring acting to spread the links apart and thus urge the handgrip 16 away from the case wall 12 to its raised or carrying position. Movement of the handgrip towards the wall 12 winds up the springs.

Fixed to the wall 12, preferably centrally of the handgrip 16 by appropriate rivet or screw and nut means 56 is a catch 58 which takes the form of a hook 60 opening downwardly and towards one end of the handgrip. Opening through the undersurface 18 at the approximate center of the handgrip is an aperture 62 which communicates with an enlarged recess 63 above it thereby providing an edge 64 preferably in the form of a bead which confronts the open end of the hook 60.

Figures 1, 2:
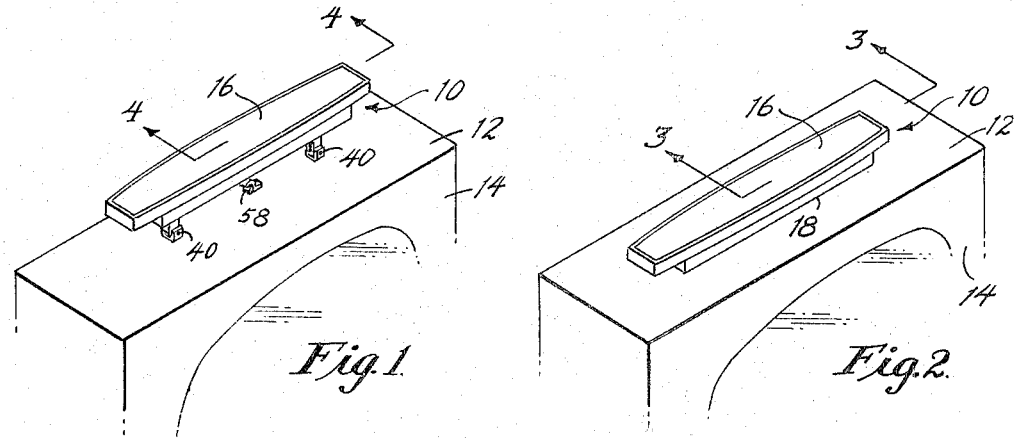
FIG. 1 is a fragmentary perspective view of the handle shown in its raised or carrying position.
FIG. 2 is a view similar to FIG. 1 showing the handle in its lowered or collapsed position.
Figures 3, 4:
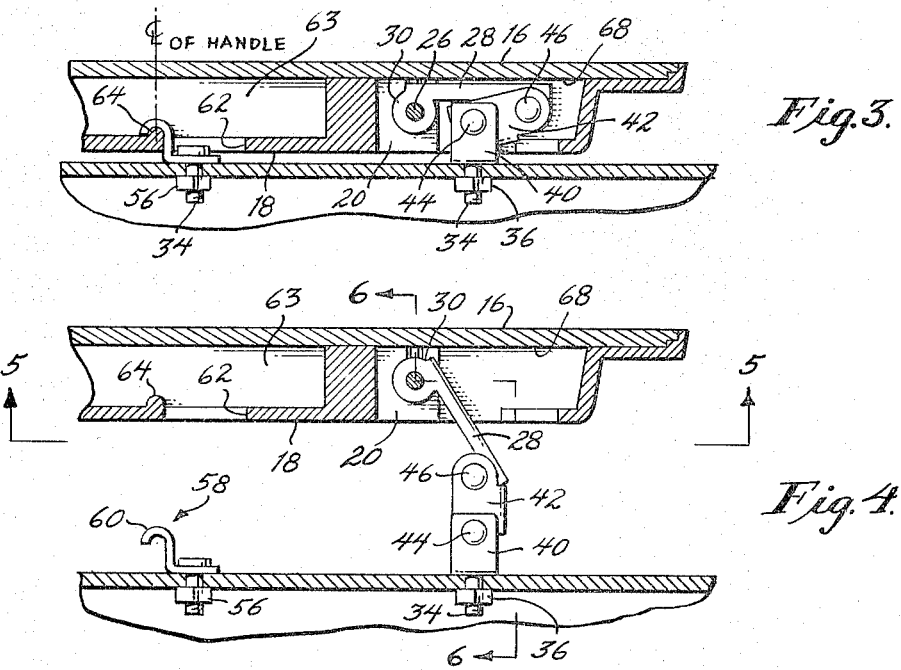
FIG. 3 is a sectional view taken on the line 3—3 of FIG. 2.
FIG. 4 is a view similar to FIG. 3 showing the handle in its raised position.
Figure 11:
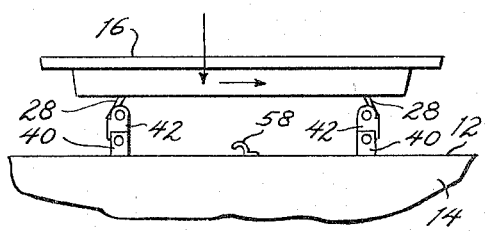
FIG. 11 is a diagrammatic view illustrating the movement of the handle to engage the catch when lowered to the collapsed position.
Figure 12:
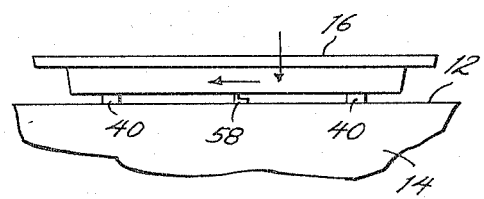
FIG. 12 is a view similar to FIG. 11 illustrating the movement of the handle to release it from the catch.

In use, the handgrip 16 is urged to its up or carrying position by the springs 50, 52, 54. To collapse the handle one pushes down on the handgrip against action of the springs until the catch 58 is received in the aperture 62 and then the handle is moved longitudinally towards the hook 60 until the bead 64 engages under the hook, as seen in FIGS. 3 and 11, and the upward pressure of the springs urges the bead 64 more firmly into the hook 60. In this action, the pins 46 reach the outer ends 66 of the elongated slots 48. In the collapsed position the links fold into and are completely confined by the recesses 20. In this action, the first or upper link 28 pivots around pin 26 until its flat portion abuts or is adjacent the inner horizontal wall 68 of the recess 20. The second or lower link 42 pivots around pins 44 and 46 inwardly towards the undersurface of the first link 28 to assume the final position shown in FIG. 3. When the handgrip is moved longitudinally away from the hook 60 until the bead 64 clears it, see FIGS. 4 and 12, the springs 50, 52, 54 urge the handgrip to its raised position. Longitudinal movement of the handgrip away from the hook 60 of the catch to effect its release therefrom is made possible by movement of the pins 46 in the elongated slots 48 towards their ends 68 opposite those shown at 66 in FIGS. 7 and 8.

While a preferred embodiment of the invention has here been shown and described, a skilled artisan may make minor variations without departing from the spirit of the invention and the scope of the appended claims.

I claim:

1. In combination with a carrying case having a wall, a collapsible handle comprising an elongated handgrip having a lower surface, a pair of spaced recesses in said handgrip opening through said surface, a pair of vertically spaced upper and lower links for each recess, a first means pivotally securing said upper link to said handgrip in said recess about a horizontal axis, a second means pivotally interconnecting said links about a horizontal axis and a third means pivotally securing said lower link to said wall about a horizontal axis, each recess being dimensioned to encompass said links when said handgrip is in a non-carrying position with its lower surface adjacent said wall and said links are in generally horizontal positions, catch means operative on said handgrip to releasably retain it in said non-carrying position, and spring means normally urging said links in generally vertical positions and said handgrip in a raised carrying position remote from said wall.

2. The combination of claim 1 wherein said catch means includes a hook member secured to said wall and an opening through said lower surface providing an edge adapted to be engaged by said hook member.

3. The combination of claim 2 wherein one of said link pivoting means includes an elongated slot in said link and a pivot pin extending therethrough, the length of said slot being such as to permit longitudinal movement of said handgrip to a point where said edge of said opening in said lower surface of said handgrip clears said hook member so that said springs can act to urge said handgrip to said upward carrying position.

4. The combination of claim 1 wherein each of said spring means includes portions bearing upon each of said upper and lower links urging them apart and into generally vertical positions.

5. The combination of claim 1 wherein said second means pivotally interconnecting said links includes a pivot pin and each of said spring means includes a wire coiled about said pin having ends bearing against each of said first and second links urging them apart and into generally vertical positions.

6. The combination of claim 5 wherein said pivot pin is carried by one of said links and elongated slots in the other link receiving said pin, the length of said slot being such as to permit longitudinal movement of said handgrip to a point where it is free of said catch means.

7. The combination of claim 6 wherein said catch means includes a hook member secured to said wall and an opening through said lower surface providing an edge adapted to be engaged by said hook member.

8. In combination with a carrying case having a wall, a collapsible handle comprising an elongated handgrip having a lower surface, at least one recess in said handgrip opening through said surface, a pair of pivotally interconnected links, means pivotally securing one of said links in said recess, means pivotally securing the other of said links to said wall, said recess being dimensioned to encompass said links when said handgrip is in a non-carrying position with its lower surface adjacent said wall and said links are generally horizontal, catch means operative on said handgrip to releasably retain it in said non-carrying position, and spring means normally urging said links in generally vertical positions and said handgrip in a raised carrying position remote from said wall.

References Cited by the Examiner

FOREIGN PATENTS 338,631 9/1919 Germany.
317,775 8/1929 Great Britain.

FRANKLIN T. GARRETT, *Primary Examiner.*